(12) United States Patent
Von Wimmersperg

(10) Patent No.: US 8,181,941 B2
(45) Date of Patent: May 22, 2012

(54) GAS BUBBLE STORAGE

(75) Inventor: Udo Von Wimmersperg, Bellport, NY (US); Laurinel Owen, legal representative, Bellport, NY (US)

(73) Assignee: HCE, LLC, Oakton, VA (US)

( * ) Notice: Subject to any disclaimer, the term of this patent is extended or adjusted under 35 U.S.C. 154(b) by 946 days.

(21) Appl. No.: 12/279,868

(22) PCT Filed: Feb. 20, 2007

(86) PCT No.: PCT/IB2007/050547
§ 371 (c)(1),
(2), (4) Date: Aug. 19, 2008

(87) PCT Pub. No.: WO2007/099475
PCT Pub. Date: Sep. 7, 2007

(65) Prior Publication Data
US 2009/0000193 A1 Jan. 1, 2009

Related U.S. Application Data

(60) Provisional application No. 60/767,121, filed on Mar. 4, 2006.

(51) Int. Cl.
*B01F 3/04* (2006.01)

(52) U.S. Cl. ............................. 261/81; 261/105; 261/113

(58) Field of Classification Search ................ 261/26, 261/28, 81, 102, 105, 113, 122.1, 152; 219/121.6
See application file for complete search history.

(56) References Cited

U.S. PATENT DOCUMENTS

| | | | | |
|---|---|---|---|---|
| 6,960,307 B2 * | 11/2005 | LeClair | ............................ | 216/52 |
| 2003/0139041 A1 * | 7/2003 | LeClair | ......................... | 438/689 |
| 2004/0054357 A1 * | 3/2004 | O'Donnell | ......................... | 606/4 |
| 2006/0054205 A1 * | 3/2006 | Yabe et al. | ..................... | 134/184 |
| 2006/0060991 A1 * | 3/2006 | Holsteyns et al. | ............... | 261/81 |
| 2008/0317664 A1 * | 12/2008 | Zhang et al. | ............... | 423/648.1 |
| 2009/0273103 A1 * | 11/2009 | Watanabe | .......................... | 261/5 |

* cited by examiner

*Primary Examiner* — Charles Bushey
(74) *Attorney, Agent, or Firm* — Louis Ventre, Jr.

(57) ABSTRACT

A quasi-liquid of gas in bubbles of nanometer-scale, and devices and processes for making the quasi-liquid. A device includes a channel plate (30) through which an operating gas flows to form micrometer-sized bubbles in a liquid. The bubbles are compressed to nanometer scale by action of cooling and pressure in a hydrophobic liquid (20) or are further fragmented to nanometer scale by a laser. Alternatively, a device has vertical water column having a bottom insertion tube, a bottom exit port, a top extraction port, and a water inflow tube; and, a centrifuge adjoining the top extraction port. A storage gas is diffused into pores of a low-density, solid-content material such as aerogel. The material is then introduced through the bottom insertion tube into an underwater environment creating cavities and a quasi-liquid.

33 Claims, 2 Drawing Sheets

GAS BUBBLE STORAGE

CROSS-REFERENCE TO RELATED APPLICATIONS

The present invention claims the benefit of the filing date of U.S. provisional application 60/767,121 filed 4 Mar. 2006, the text of which is included by reference herein.

TECHNICAL FIELD

In the field of gas storage, a quasi-liquid comprises gas in bubbles of nanometer-scale, and devices and processes are disclosed for making the quasi-liquid.

BACKGROUND ART

The quasi-liquid, devices for making the quasi-liquid, and processes for making the quasi-liquid are not known in the prior art. The purpose of the preferred embodiments of the invention is to produce nanometer-scale gas bubbles or cavities that constitute the quasi-liquid. Water is the preferred fluid constituting the skin or wall of the bubble containing the gas, but other liquids are within the scope of the invention. For simplicity, water is used as the primary example herein.

While there is a scientific distinction between gas cavities and gas bubbles, this distinction has no material significance in the invention. The use of these terms herein is generally consistent with the correct distinction between the terms, but the invention encompasses an interchangeable use of the terms, such that the term 'bubbles' means and includes the term 'cavities.'

While gas cavity is a gas bubble and the terms cavity and bubble are used interchangeably, an explanation of the scientific distinction may aid in understanding the background of the phenomenon employed in the invention. A gas cavity is essentially a gas within a spherical skin, or wall, that confines the gas, but the matter constituting the skin is also the matter that is outside the skin. For example, hydrogen surrounded by a water skin in a water bath would be classified as a cavity because the skin and the surrounding medium are the same matter, namely water. Because there is a different medium on only one side of the skin, the skin is said to have a single layer.

In contrast, a bubble refers to a gas within a spherical skin, or wall, that confines the gas, but the matter constituting the skin is different than the matter that surrounds the skin. For example, hydrogen surrounded by a water skin in an air environment would be classified as a bubble because the skin is different from the surrounding medium, namely air. The skin of water permits confinement of the hydrogen and a transition from the gas to the water skin to the air environment. Because there is a different medium on both sides of the skin, the skin is said to have a double layer.

An important physical distinction between a double layer bubble a single layer cavity is that there is twice the surface tension in a double layer bubble than a single layer cavity. Thus, converting from a single layer cavity to a double layer bubble immediately subjects the gas inside to twice the amount of pressure.

A disclosed device for making the quasi liquid of the invention makes micro- and nanometer-scale bubbles, typically water bubbles filled with a gas to serve as a storage medium for the gas. The aggregated bubbles are themselves a product forming a quasi-liquid.

At nanometer scales, which are generally diameters in a range of about 10 nanometers to 0.8 nanometers, surface tension can maintain the gas within a bubble at very high pressure. Importantly also, the smallness of such bubbles or cavities confers on them stability against gravitational aggregation and merging. The most common examples of high value gases usable in such a storage medium are natural gas or methane, hydrogen, and propane.

For purposes of simplifying this disclosure, hydrogen is used as the primary example of the gas because it is thought to be the best use of the invention. However, the invention is not limited to hydrogen storage or to the foregoing example gases, but may be applied to any suitable gas.

The invention is useful in creating a means for storing hydrogen in a stable medium having a volumetric energy density about the same as that of gasoline and capable of being used in a manner similar to gasoline. The preferred products from the process are useful because they are a stable suspension of nanometer-sized bubbles or cavities, which behave much as if it were a 'liquid' and can be burned in much the same way as gasoline or used in hydrogen fuel cells without further processing.

For bubbles that are not cavities, a preferred embodiment of the invention creates a collection of individual water bubbles of nanometer scale filled with hydrogen. When herded or aggregated together, the collection of bubbles is essentially indistinguishable from a liquid.

For bubbles that are cavities, a preferred embodiment of the invention creates a concentration or crowd of hydrogen cavities existing closely together within a surrounding water medium. This is a concentrated volume of cavities, which is preferred because the volume of the surrounding water medium is, thereby, minimized, which minimizes the size of the equipment needed and also the potential for diluting the resulting product with excess water.

The process of producing bubbles or cavities of hydrogen is generally called 'fragmentation' of the gas. Subsequent concentration of the cavities, or formation and capture of bubbles, is generally called 'herding' of cavities or bubbles.

The process of forming bubbles is termed a 'differential condensation process.' The process of forming cavities is termed a 'gel process.'

Preferred methods for producing the quasi-liquid of the invention using the gel process employ any solid material having molecular-scale pores to fragment the gas to be stored into pore-sized quanta or fragments. A preferred embodiment of the invention uses a molecular-pore structure within a silica gel to fragment the gas. A typical example of silica gel is 'aerogel' and aerogel is used as the primary example in this disclosure. Aerogel has seen application as a desiccant to absorb water because it has a very high affinity to water. Upon contact with liquid water, it spontaneously disintegrates, which has generally been considered a negative attribute. Aerogel's high water affinity and disintegration in the presence of liquid water are useful properties for the present invention. Aerogel is also used as a thermal insulator and as a selective optical filter for infrared light. In its prior uses, aerogel has not been used heretofore for gas fragmentation, that is, to create nanometer-scale gas quanta.

Preferred methods for producing the quasi-liquid of the invention using the differential condensation process employ a channel plate having at least its exit face below the surface of liquid, typically water or a hydrophobic liquid; and an operating gas flowably connected to one end of the channel plate such that the operating gas can pass through the channel plate and out its exit face.

The preferred methods produce cavities or bubbles that are about 1,000 billion times smaller than bubbles visible to the human eye. Cavities made with the gel process are about 1,000 times smaller than the bubbles initially created after exiting a channel plate in the differential condensation process, resulting in an enhanced method for the production of nanometer gas cavities for gas storage.

While both the gel process and the differential condensation process are preferred methods of producing the quasi-liquid, an advantage of the gel process over the differential condensation process, is that the quantity of hydrogen-containing fluid flow required is greatly reduced. This is due to the factor of a thousand smaller size of silica gel pores, compared to the diameter of multi-channel plate tubes. There is also a greater simplicity inherent in the gel process. The advantage of the differential condensation process over the gel process is that the differential condensation process provides a method for constructing bubbles in a precisely controlled fashion, making it possible, for example, to obtain uniformity in bubble size. It also has the advantage of minimizing the amount of water surrounding the bubbles.

A stable product that can store hydrogen such that its energy density approaches that of gasoline has been long sought in the art. The lack of means for safe, convenient, lightweight and compact hydrogen storage is a large impediment to the widespread use of hydrogen, for example for powering automotive vehicles.

Hydrogen has the highest mass energy density of any fuel. It has about twice as much energy per kilogram as natural gas, about three times as much as gasoline and about 6 times as much as methanol. The problems stem from hydrogen's density and storage volume. At room temperature and pressure, hydrogen is a gas with a unit volume energy content about one thousand times too low for practical applications.

The liquid form of hydrogen requires a temperature below minus 253 degrees Centigrade and it has a volumetric energy density of about 8 megajoules per liter, which compares to gasoline at about 26 to 31 megajoules per liter. This temperature is impractical for most applications and even if one could maintain such temperature, the energy content per unit of volume would be still only about 25% that of gasoline.

The best pressurized-hydrogen storage systems today can achieve a pressure of about 3,600 pounds per square inch (about 250 atmospheres). Some are exploring very high-pressure storage at about 12,000 pounds per square inch (about 800 atmospheres). There is no existing art capable of storing hydrogen at about 43,500 pounds per square inch, as is the case with the present invention.

The surface tension of a hydrogen-filled nanometer-scale water bubble of the invention contains hydrogen at a pressure of 43,500 pounds per square inch (about 3,000 atmospheres). At this pressure, a suspension of nanometer-scale bubbles of hydrogen is expected to have a volumetric energy density (higher heating value) from about 24 to 29 megajoules per liter. The stated range is attributable to uncertainties in compressibility and small-scale cohesion factors. This compares favorably with the energy density for gasoline at about 26 to 31 megajoules per liter.

One of the most promising methods for storing hydrogen is intermetallic hydrides, which have up to six times the volumetric energy density of pressurized, room temperature hydrogen. However, high manufacturing costs, complex mechanisms for storing and releasing the hydrogen, toxicity problems in end-of-life disposal, and the weight penalty for such storage systems diminish their practicality. The weight penalty is notable because, for example, the best obtainable such systems require that about 93 percent of the weight be the metal storage medium and only about 7 percent be hydrogen. A discussion of the prior art for hydride alloys may be found in U.S. Pat. No. 6,193,929 to Ovshinksy on Feb. 27, 2001 entitled, "High Storage Capacity Alloys Enabling a Hydrogen-based Ecosystem."

Conventionally, hydrogen has been stored in pressure-resistant vessels under a high pressure or stored as a cryogenic liquid, being cooled to an extremely low temperature. These methods raise safety concerns and offer less volumetric storage density than storage in metal hydrides. In addition, storage of hydrogen as a compressed gas involves large vessels and storage as a liquid involves cryogenic vessels. Such vessels make the use of hydrogen to power vehicles less feasible.

Various embodiments of the process of the present invention include a unique combination of existing technology (e.g., channel plates, lasers, sonic devices used in unrelated fields), and known fundamental processes (e.g., surface tension, density, viscosity, cooling, immiscibility of hydrophobic liquids, and water). Employing the method of the invention in these embodiments, the technologies and processes produce safe, convenient, lightweight and compact storage means for hydrogen gas.

Channel plates, also known as microchannel plates and multi channel plates, are well known, commonly available devices used in the physics community to detect photons by releasing and multiplying electrons when impacted by photons. Channel plates are essentially of a collection of micrometer sized glass tubes (also called canals, pores, or pipes) with each tube having a diameter, or pore size, from about 5 microns to about 100 microns. The formation of microchannel plates and the process of making them are well known and disclosed, for example, in U.S. Pat. No. 4,853,020 to Sink on Aug. 1, 1989. Channel plates are used in such common commercial products as scanning electron microscopes, night vision goggles and cameras.

In a preferred embodiment of the present invention, a channel plate is not used as a photon detector or electron multiplier. Rather, a channel plate serves to create micron size diameter gas flow through the pores of the channel plate. This application for channel plates is new.

In a preferred embodiment of the present invention, a hydrophobic liquid is employed. Hydrophobic liquids are well known in the art. Mineral oil, fats, waxes, liquid perfluorodecalin are all examples. Essentially, hydrophobic liquids are those that are insoluble in water.

Hydrophobic liquids have diverse uses. For example, a hydrophobic liquid can be used to coat a sweetener in a food and provide a controlled release as in U.S. Pat. No. 4,824,681 to Schobel on Apr. 25, 1989. Another example is U.S. Pat. No. 6,846,390 to Bishkin on Jan. 25, 2005 which discloses the use for hydrophobic liquid in a liquid piston pump to increase steam pressure to aid in heat transfer, and then after the energy in the steam is extracted, liquid water and hydrophobic liquid are easily separated.

When a hydrophobic liquid is combined with liquid water, the two liquids tend to separate from each other in a process called liquid/liquid partitioning. This partitioning process can in part be based on density, with one or the other rising to the top.

In a preferred embodiment of the present invention, a channel plate is used to inject the vapor of a hydrophobic liquid into a reservoir containing the liquid phase of the same substance. Micrometer-scale gas bubbles are thus formed. This is a unique application for hydrophobic liquids.

Lasers used in an alternative embodiment of the invention are also known. For example, the argon laser was invented in 1964 and is one of a family of Ion lasers that use a noble gas as the active medium. However, lasers have not been used to create nanometer-scale bubbles as in the present invention.

The noted argon ion laser is highly suited to penetrate water and be absorbed only at the optical discontinuity presented by gaseous bubbles.

DISCLOSURE OF INVENTION

Technical Problem

The storage of gases is presently limited to pressures about 12,000 pounds per square inch, requires heavy containers to sustain these pressures, creates significant safety concerns, has a significant cost, presents many inconveniences for consumer use, such as hydrogen for vehicle propulsion, and requires significant energy resources to achieve the storage pressures. Additionally, gas liquefaction requires significant energy resources to reach and sustain liquefaction temperatures, specially designed cryogenic storage vessels, and even in liquid form for combustible gases such as hydrogen, cannot deliver energy densities comparable to gasoline. And finally, storage in matrices, such as metal hydrides, requires heavy components, presents toxicity problems when disposed of, and does not achieve energy densities near that of gasoline.

Technical Solution

A product, means and method are disclosed for storage of gases in bubbles or cavities of nanometer scale wherein the pressures of storage are determined by water surface tension. When combustible gases are stored, the resulting quasi-liquids comprised of the bubbles or cavities have energy densities comparable to gasoline.

Advantageous Effects

The invention provides for safe, convenient, lightweight and compact storage of gases in bubbles or cavities at pressures 3 to 4 times that otherwise achievable using current compression technologies. No heavy containers are needed for storage. There are no end-of-life toxicity problems. The water base of the bubbles or cavities is non-polluting and when combustible gases are stored, enables clean burning or chemical consumption of the gases.

BEST MODE

The invention is a quasi-liquid made of gas in bubbles or cavities of nanometer-scale, and devices and processes for making the quasi-liquid. A preferred device comprises a channel plate having at least its exit face below the surface of a liquid, typically water or a hydrophobic liquid; and an operating gas flowably connected to one end of the channel plate such that the operating gas can pass through the channel plate and out its exit face forming micrometer sized bubbles. The bubbles are then further compressed to nanometer scale by action of cooling and pressure in a hydrophobic liquid or are further fragmented to nanometer scale with a laser. The quasi-liquid is the aggregation of bubbles collected from the surface of the liquid. Another preferred device is a vertical water-column having a bottom insertion tube, a bottom exit port, a top extraction port, and a water inflow tube; and, a centrifuge adjoining the top extraction port. A storage gas is diffused into pores of a low-density, solid-content material such as aerogel. The material is then introduced through the bottom insertion tube into an underwater environment such that cavities are formed. The cavities are then concentrated or extracted to form a quasi-liquid.

MODE FOR INVENTION

In the following description, reference is made to the accompanying drawings, which form a part hereof and which illustrate two preferred embodiments of apparatus for making the quasi-liquid of the invention. The drawings and the preferred embodiments are presented with the understanding that the present invention is susceptible of embodiments in many different forms and, therefore, other embodiments may be utilized and structural and operational changes may be made without departing from the scope of the present invention.

The drawings show the components of the preferred embodiments of devices for making the quasi-liquid in a sectional view. As noted above, hydrogen is used as the primary example of the gas to be stored in water bubbles because it is thought to be the best use of the invention. However, the invention is not limited to hydrogen storage or water bubbles, but may be applied to any gas and any liquid forming bubbles. Typical of gases that could be stored using the invention are hydrogen, propane and natural gas. When hydrogen is noted herein, such notation should also be considered a reference to any other gas to be stored.

The preferred devices for making the quasi-liquid, which will be described, and the methods of using these devices are perhaps best understood if the overall processes of the preferred embodiments of invention are first described. So, the FIG. 1 illustration of the first embodiment of the device for making the quasi-liquid is discussed first along with some alternatives and then the FIG. 2 illustration of the second embodiment of the device for making the quasi-liquid along with some alternatives is discussed.

Figure 1:
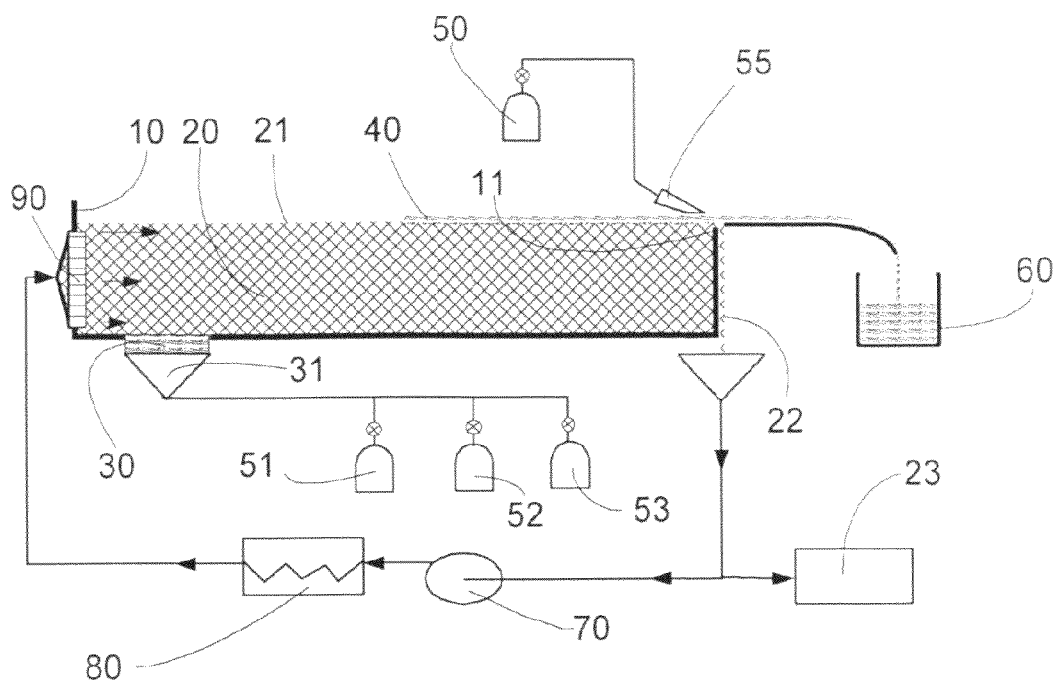
FIG. 1 is a sectional view of first embodiment of a device for making the quasi-liquid from bubbles.
Figure 2:
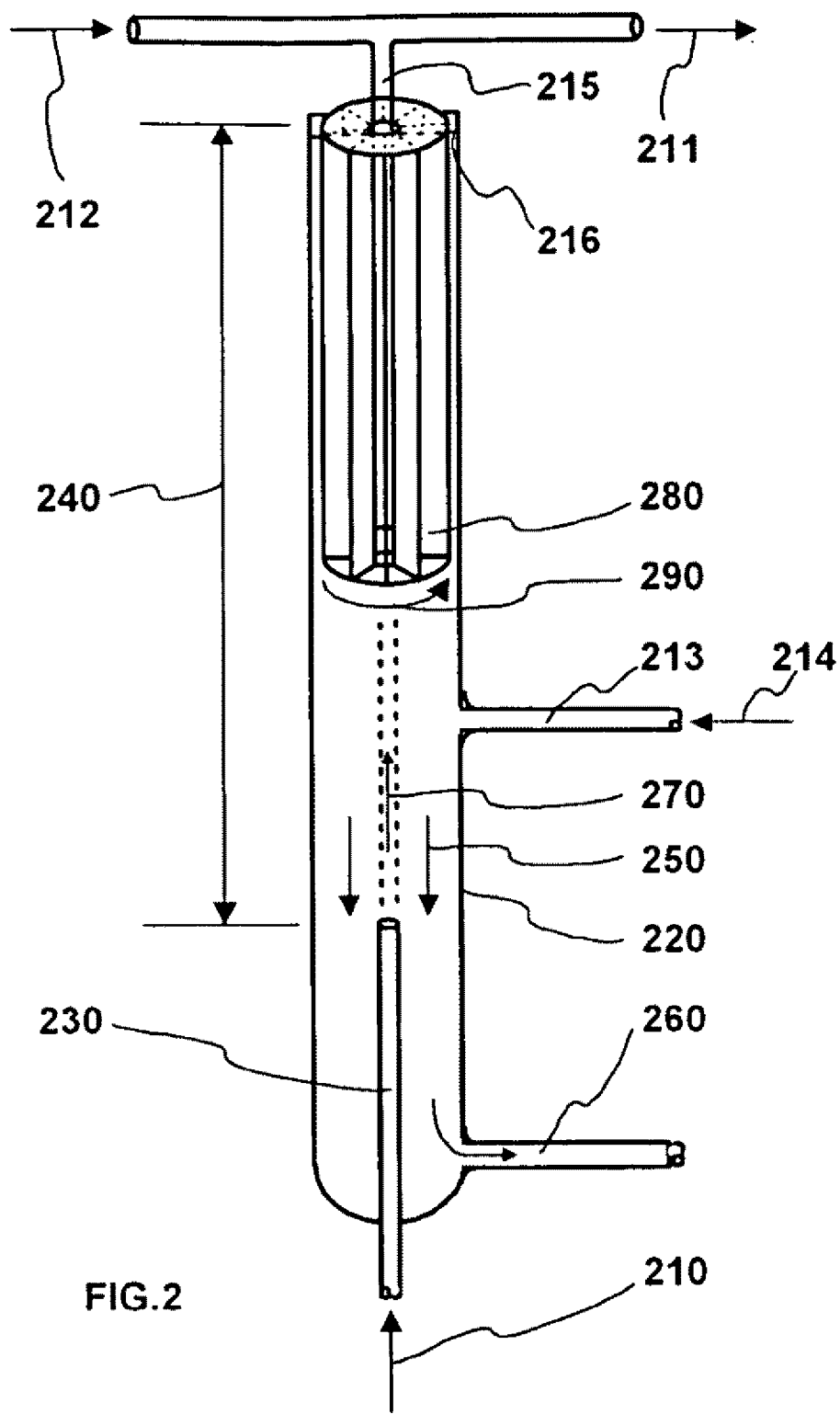
FIG. 2 is a sectional view of second embodiment of a device for making the quasi-liquid from cavities in water.

FIG. 1 illustrates the first embodiment of the device for making the quasi-liquid. A channel plate (30) is used to inject a gas, typically a gas mixture, below the surface (21) of a reservoir containing the liquid phase of a hydrophobic liquid (20). The preferred gas mixture is composed of steam, a vapor of the hydrophobic liquid and the gas, such as hydrogen, to be stored in bubbles.

Upon injection, micrometer-scale gas bubbles are formed. The injected gas mixture is preferably spiked with precisely controlled amounts of hydrogen and water vapor. The hydrophobic liquid is selected to have a boiling point above that of water, so that upon cooling its vapor condenses first on the inner wall of the bubble. Only after all the vapor of the hydrophobic liquid has condensed, does the water condense on the inner wall of the greatly reduced bubble. The fractions of water and hydrogen are chosen to just allow a gapless water skin to form about the remaining core of hydrogen gas when it is under compression from the surface tension of the water skin. In this way, water-skinned hydrogen bubbles of any desired size can be constructed by controlling the composition of the injected gas mixture. In particular, this method provides a means to produce the smallest bubbles possible, down to dimensions where finite molecular size prevents the formation of continuous surface tension skins.

In its most basic form, the first embodiment of the device for making the quasi-liquid comprises a channel plate having at least its exit face below the surface of a liquid; and a gas comprising at least the gas to be stored flowably connected to one end of the channel plate such that the gas can pass through the channel plate and out its exit face to form bubbles.

The channel plate (30) comprises micrometer sized, or smaller, glass tubes. As used herein the term "channel plate" includes any collection of micrometer-sized or smaller tubes whether or not manufactured with an intended use involving the detection of photons or conduction of electrons. Channel plates commonly available have a pore size from about 5 microns to about 100 microns, but smaller pores sizes are within the scope of the invention. The preferred orientation of the channel plate is such that its tubes are approximately vertical in orientation. A vertical orientation is preferable because it permits unimpeded gas flow through the channel plate to exit and condense into bubbles.

The liquid may be any liquid. The two liquids used as examples herein are water and a hydrophobic liquid. The use of other liquids is within the scope of the invention, including combinations of liquids or other additives such as those to change the freezing point or boiling point of the liquid.

The gas to be passed through the channel plate may be simply the gas to be stored in bubbles, termed the "storage gas" herein. For simplicity, the storage gas used as the primary example is hydrogen. The gas to be passed through the channel plate may also be a gas mixture. Whether only the storage gas or a gas mixture, the gas that passes through the channel plate is herein termed the "operating gas." Ideally, the operating gas should not be dissolvable in the liquid, as this would diminish the efficiency of the operation, nor should it be dissolvable in the fluid that forms the bubble wall as this would permit the operating gas to eventually escape the bubble.

The gas mixture, or operating gas, in the preferred embodiments discussed herein comprises the storage gas, steam and a vapor of the hydrophobic liquid.

In reference to the FIG. 1, the first embodiment of the device for making the quasi-liquid includes a vessel (10) of hydrophobic liquid (20) that is preferably denser than water; a channel plate (30) having at least its exit face below the surface of the hydrophobic liquid; and an operating gas of hydrogen, water vapor and the vapor of the hydrophobic liquid. The operating gas is flowably connected to one end of the channel plate such that the operating gas can pass through the channel plate and out its exit face into the hydrophobic liquid (20).

A typical hydrophobic liquid is 1,4 diiodobutane, which has a density of 2.35 grams per milliliter This hydrophobic liquid has a boiling point of 125 degrees Centigrade and a melting point of 5.8 degrees Centigrade. It is preferred that the density be greater than water to assist in the formation of water bubbles filled with hydrogen and to favor a buoyant upward flow of water bubbles filled with hydrogen during operation of the device.

The top surface or exit face of a channel plate (30) contacts the hydrophobic liquid below its surface in the vessel. The drawing shows the exit face of the channel plate (30) at the bottom of the vessel, with most of the channel plate (30) outside the vessel and not in contact with the hydrophobic liquid. In alternative embodiments, the channel plate is simply submerged in the vessel.

In the preferred embodiment, the channel plate is held at a temperature slightly above the boiling point of the hydrophobic liquid by controlling the temperature of a gas mixture passed through the channel plate. In this embodiment, the exit face of channel plate is its only face directly exposed to the cold hydrophobic liquid in order to minimize unnecessary heat loss from the channel plate to the hydrophobic liquid.

In the preferred embodiment, a gas mixture of hydrogen, water vapor, and the vapor of the hydrophobic liquid is the operating fluid that is processed in the first embodiment of the device to make nanometer scale water bubbles filled with hydrogen gas. The gas mixture consists mainly of the vapor of the hydrophobic liquid. Added are a small fraction of hydrogen and a still smaller fraction of water vapor. The water vapor forms the bubble wall upon condensing in the hydrophobic liquid.

Choosing the ratios of the three ingredients in the gas mixture controls the size of the final nanometer scale bubble. Given micrometer tubes in the channel plate, the preferred ratios of hydrogen and water vapor in the hydrophobic vapor are about 40 and 10 parts per million, respectively. A reduction in channel plate canal diameter to 0.1 micrometers would increase these ratios to 4 percent and 1 percent, respectively. Smaller size channel plate canal diameters are within the scope of the invention, and could be utilized with adjustments for impact on vapor flow due to larger pressure drops associated with the smaller diameters.

In the first embodiment of the device for making the quasi-liquid, the operating gas, or gas mixture, is supplied from three tanks and heater sources: one for the vapor of the hydrophobic liquid (51); one for steam (52); and one for hydrogen. The gas mixture is metered at the correct ratio to a plenum (31) connected to the entry or bottom face of the channel plate (30). The gas mixture is at a temperature above the boiling points of the three gases and at a sufficient pressure to enable a flow of the gas mixture through the channel plate.

In alternative embodiments, the gas mixture further comprises additives, such as those to improve the surface tension properties of liquid water or antifreeze compositions to alter the freezing point of the quasi-liquid.

In the first embodiment of the device for making the quasi-liquid, micrometer scale bubbles of the operating gas emerge from the exit face of the channel plate (30) surrounded by cold, dense hydrophobic liquid. In this embodiment, as the buoyant vapor bubbles rise across a laminar flow, the bubbles are cooled in the cold and dense hydrophobic liquid. During this rising across the laminar flow, the hydrophobic vapor condenses, leaving a void containing water vapor and hydrogen. The water vapor then condenses on the wall of the void and forms a bubble wall or skin around the hydrogen gas. The condensation of water vapor forms the bubble wall as it rises through cold hydrophobic liquid.

In addition, the microspherical bubbles are also forced to compress to nanometer scale by the surface tension of the water skin contained by the hydrophobic liquid. The cooling during the rise across the laminar flow, coupled with the action of surface tension, ultimately create spherical hydrogen bubbles of nanometer-sized diameters with a water skin. Laminar flow promotes the temperature gradient that is part of an efficient thermodynamic cycle, which in turn furnishes the energy for surface tension compression. Water has the strongest surface tension of all practical liquids and is environmentally benign and inexpensive. In the case of nanometer-scale bubbles (20), the surface tension of the water skin compresses the hydrogen to about 3,000 atmospheres.

The preferred 3 to 1 ratio of hydrogen to water in the gas mixture (75% hydrogen to 25% water) derives from a goal to provide a gap-less wall for the smallest possible bubbles. For the various embodiments, the optimal trade-off would be evaluated between the water burden and hydrogen content at the highest pressure.

The first embodiment of the device for making the quasi-liquid increases the efficiency of bubble formation by including a means for minimizing boiling of the hydrophobic liquid above the exit face of the channel plate. This means for minimizing boiling is a nozzle (90) and laminar flow of cold hydrophobic liquid across the exit face of the channel plate (30). This cross-wise laminar flow also carries the bubbles horizontally away from the channel plate.

The gas filled bubbles formed in the hydrophobic liquid are aggregated or herded by the laminar flow towards the end of the vessel and rise to the surface (21) of the hydrophobic liquid in something like a froth (40). The laminar cooling flow across the exit face of the channel plate seconds as a mechanism for concentrating the nanometer-scale bubbles. When hydrogen is the storage gas, the nanometer-scale bubbles of behave like that of a liquid similar in density to that of gasoline.

The first embodiment of the device for making the quasi-liquid includes a means for collecting the hydrogen filled nanoscale water bubbles off the surface of the fluid in the vessel. In this embodiment, such means is a gas flow acting on the bubbles and delivering them to a collection container. To create this gas flow, a pressurized inert gas source (50), such as nitrogen, is exhausted through a nozzle (55) operating on the surface nanometer scale bubble layer at the end (11) of the vessel, pushing the bubbles over a narrow gap where it flows into a collection container (60). In this embodiment, the collection container (60) is the means for collecting the hydrogen filled nanometer scale water bubbles off the surface of the fluid in the vessel.

In alternative embodiments, suitable for industrial-scale production, the bubbles are herded using a cyclone configuration in which the heavier liquid is centrifuged to the perimeter flow, leaving the bubbles to congregate on axis. In yet other embodiments, a mechanical paddle is employed to sweep the bubbles off the surface into a collection container.

In all these various embodiments, the collected nanometer-scale bubbles are then delivered as a product. While a pure product of such bubbles will be possible, it is expected to enhance stability of the quasi-liquid to retain a small fraction of hydrophobic liquid in with the bubbles. This can be captured at the point of hydrogen release (injector or fuel cell), and subsequently recycled.

An important advantage of the first embodiment of the device for making the quasi-liquid lies in making the hydrogen filled nanometer scale water bubbles without employing mechanical components other than low-pressure pumps. Naturally occurring fluid flow mechanisms are employed.

The first embodiment of the device for making the quasi-liquid includes a means for cooling the hydrophobic liquid in the vessel to maintain a temperature below the lower boiling point of either the hydrophobic liquid or water. Heat is released to the hydrophobic liquid during operation. So, performance of the invention will be improved if the hydrophobic liquid is cooled to minimize hydrophobic liquid boiling.

One source of heat is the channel plate (30), which, for optimal performance, is maintained at a temperature just above the boiling point of the hydrophobic liquid. A second source is the gas mixture. Both the hydrophobic vapor and water vapor exiting the channel plate are condensed to liquid state, releasing the latent heat of vaporization to the hydrophobic liquid. The hydrogen gas is also cooled, releasing heat to the hydrophobic liquid.

In the first embodiment of the device for making the quasi-liquid, the means for cooling is a heat exchanger (80), which removes energy from the hydrophobic liquid. This cooled hydrophobic liquid is returned to the vessel and maintains the hulk of hydrophobic liquid at a temperature that will promote the process of condensation, cooling, and formation of the nanometer-scale bubbles.

The first embodiment of the device for making the quasi-liquid includes a means for maintaining the level of hydrophobic liquid in the vessel. This means permits the efficient removal and collection of excess hydrophobic liquid at the rate required to maintain the steady level of hydrophobic liquid in the vessel.

During operation of the device, the gas mixture exiting the channel plate contains mostly hydrophobic liquid that is condensed to the liquid state. This condensation process adds hydrophobic liquid to the vessel. To maintain the level of hydrophobic liquid in the vessel, hydrophobic liquid (20) is preferably removed at the same rate it is being introduced by the flow of the gas mixture.

In the first embodiment of the device for making the quasi-liquid, the means for maintaining the level is a simple overflow (22) out of the vessel. Excess hydrophobic liquid overflows the end (11) of the vessel, constituting a weir. In order to operate at a steady state, a portion of the overflow (22) hydrophobic liquid is removed (23). The rate of removal is about the same as the rate the hydrophobic liquid is added by flow through the channel plate (30). A pump (70) sends a constant flow of hydrophobic liquid to a heat exchanger (80) to cool it down and then returns it to the vessel (10) via the nozzle (90) to achieve laminar flow across the exit face of the channel plate (30).

In an alternative embodiment, the liquid is water and the operating gas is the storage gas. This embodiment further includes a laser for fracturing or exploding the bubbles emerging from the channel plate into nanometer-scale bubbles. A preferred laser for this embodiment is an argon ion laser because its monochromatic light source has a very narrow bandwidth at wavelengths that will penetrate the water with minimal energy loss and efficiently deposit energy on the bubbles emerging from the channel plates. Other lasers may be used and are within the scope of the invention.

In an alternative embodiment, a sonic device, such as an ultrasound transducer, is attached to the channel plate to deposit high frequency energy, preferably at the natural frequency of the bubbles, to dislodge bubbles emerging from the exit face of the channel plate.

FIG. 2 illustrates the second embodiment of the device for making the quasi-liquid. A vertical water column (220) having a surface (216), a bottom insertion tube (230), a bottom exit port (260), a top extraction port (215) above the surface (216) of the water column (220), and a water inflow tube (213). A centrifuge (280) is optionally used to concentrate the cavities along the axis of the column by spinning out the higher density water to the periphery of the column and then in a downward direction.

The method of using the second embodiment of the device for making the quasi-liquid, diffuses a gas to be stored into nanometer-scale pores, that is molecular-scale pores, of a low density, solid-content material. Any solid-content material having such pores capable of holding gas is acceptable. Once stored in the pores, the gas is essentially fragmented into pore-sized quanta or fragments. Once the gas is fragmented by storage in the pores, it is then displaced, dislodged or otherwise removed from the pores in an underwater environment such that a significant portion of the gas cavities emerging from the pores do not aggregate into gas cavities larger than the pore size from which the gas was displaced, dislodged or otherwise removed.

As with the first embodiment, hydrogen is used as the preferred example of the gas to be stored. In the method of using the second embodiment, aerogel, which is silica gel, is the preferred example of a solid material having pores that is pressurized with hydrogen gas. Pressurized aerogel is extruded (210) into the vertical water column (220) through a bottom insertion tube (230) at a depth or water head (240) where the hydrostatic pressure approximately matches the hydrogen gas pressure in the aerogel. The aerogel structure disintegrates in the presence of liquid water and is crushed inwards in a radial direction. Silica solids from the disintegration settle (250) as silicic acid and exit through a bottom exit port (260) near the bottom of the column (220). Gas-filled cavities rise (270) through the water in a swarm, near the axis of the water column (220) and the bottom insertion tube (230), and are concentrated on-axis when the swarm passes through a centrifuge (280) in rotation (290) and out a top extraction port (215) where a flow of quasi-liquid and inert gas (211) or gas-filled bubbles are withdrawn from the centrifuge (280) aided by a flow of inert gas (212). The top extraction port (215) is preferably aligned along the axis of the water column. A water inflow tube (213) enables the flow of makeup water (214) into the water column.

This embodiment uses molecular-scale pores within solid silica gel to fragment the gas and aerogel is used as the primary example in this disclosure. Aerogel is composed of silicon dioxide and is a very low density, hard, porous solid silica gel. The very low density is achieved by creating aerogel with porosities in excess of 95% volume, which are available in routinely manufactured versions of this material.

In the method of using this embodiment, a first step is diffusing a gas to be stored into pores of a low-density, solid-content material. Hydrogen is the preferred gas to be stored and aerogel is the preferred low-density, solid-content material. In diffusing the gas, the gas impregnates the pores within the low-density, solid-content material, that is aerogel in the preferred embodiment.

In an alternative embodiment, hydrogen and water vapor is the initial gas that is fragmented or diffused within aerogel prior to extrusion into the bottom of the column of water. Aerogel does not disintegrate in the presence of water vapor, only liquid water causes disintegration. So, the adsorption of water vapor on the internal pore walls does not impair the integrity of the solid structure of the aerogel.

A second step in the method of using the second embodiment of the device for making the quasi-liquid, is removing the gas from the pores in an underwater environment such that cavities are formed.

Preferably, removing the gas from the pores underwater is done by extruding a slug of gas-impregnated aerogel into the bottom of a column of water, doing so at a point where the hydrostatic pressure is about equal to the gas pressure.

It is well known that permeation of liquid water rapidly disrupts aerogel's solid body through the action of capillary forces. This otherwise unwanted phenomenon is utilized in the preferred embodiment as a mechanism to promote release the gas quanta from occlusion inside the gel pores and trap them in a skin of water, wherein each pore filled with hydrogen ideally creates a cavity in the column of water.

The anticipated preferred slug size of aerogel is about one-half inch in diameter.

Generally, since the gas is removed from the pores underwater, forming cavities, there is a hydrostatic pressure operating on the cavities. Shrinkage of the cavities in the water column takes place as a result of the water surface tension force exerted on the gas. Two parameters can be adjusted to control the final size of the cavities. These are the aerogel pore radius, $R_i$, and the hydrostatic pressure, $P_i$, at the injection point. This is equivalent to metering the mass of gas that will be contained in each cavity.

Natural processes are aided by the compressibility factor in nanoscale gas cavities. At 3 atmospheres, the compressibility factor of bulk hydrogen, for example, exceeds the unity ideal gas factor by only 5 parts per thousand. At 3,000 atmospheres, the compressibility of bulk hydrogen rises to several times the ideal gas value. However, this is not so for nanometer-scale fragmented hydrogen for which the compressibility factor remains very close to an ideal gas at about 1. This phenomenon is inherent in small cavities because a large fraction of the gas molecules are adsorbed at bubble wall surface and contribute to compression. The result is that effective compressibility stays near unity. This is important to achieving the desired compression of the hydrogen that would otherwise be unobtainable using bulk hydrogen. In order to achieve the same pressure for bulk hydrogen as is obtained for nanoscale hydrogen, one would have to have compressive forces excess of that obtained at nanoscale.

Therefore, neglecting the deviation from unity of the compressibility factor, the final radius, $R_f$, of a cavity is approximately equal to the square root of the quotient determined by multiplying the hydrostatic pressure times the cube of the pore radius divided by twice the surface tension.

Finite molecular dimensions, and the requirement of a contiguous water skin, set a lower bound for the final radius, $R_f$, of about 0.5 nanometer. Choosing this value, and taking a typical silica gel pore size of 5 nanometers, inversion of the relation given above yields the required hydrostatic pressure approximately equal to twice the surface tension times the square of the final radius divided by the cube of the aerogel pore radius.

Taking the surface tension to be 0.072 Newton per meter, the required hydrostatic pressure is 0.288 megapascals, that is, about 3 atmospheres equivalent to a water head (240) of the order of 30 meters, which is the hydrostatic head in the preferred embodiment.

Generally, the hydrostatic pressure is equal to the gas pressure in the aerogel. The hydrostatic pressure may be higher or lower than the gas pressure, but must be such that it promotes cavity formation. A slightly higher hydrostatic pressure would enhance infiltration of water into the pore structure. A slightly lower hydrostatic pressure allows gas expansion to open up pathways to the pore structure and let water in. The optimized relationship between the hydrostatic pressure and the gas pressure in the aerogel is determined with knowledge of the properties of the aerogel, such as slug size, disintegration rate and pore radii.

An alternative embodiment uses a porous solid material other than one that disintegrates in the presence of water, such as zeolite. Hydrogen is forced under pressure through the porous solid material to exit in a similar column of water. The pressure essentially forces hydrogen to fragment into the pores and then exit the material forming a cavity in the column of water. For this embodiment, the step for removing the gas from the pores in an underwater environment is performed by forcing the gas through the pores of the low-density, solid-content material.

A third step in the method of using the second embodiment of the device for making the quasi-liquid, is concentrating the cavities to form a quasi-liquid. When hydrogen is used as the storage gas, the quasi-liquid will have a density approximately equal to gasoline.

In the method of using the second embodiment of the device for making the quasi-liquid, when the aerogel disintegrates, vertical separation between solid and gas cavities takes place under the action of gravity. The initial density of the cavities is two orders of magnitude lower than water, while the solid silica molecules tend to combine sequentially with water to form metasilicic and insoluble silicic acid with specific gravities around 2.1 and 1.5, respectively. As a result, there is an initially rapid upward movement of gas-filled cavities and a downward drift of solids. Disintegrated gel in the form of silicic acid is removed from the water column through the bottom exit port (260) and recycled, using well-established recipes for gel formation.

Upon release from the silica gel by gradual permeation of the water into the aerogel, the gas cavities initially occupy 95% of volume of the column. After cavity shrinkage under surface tension, this volume fraction is reduced by a factor of a thousand.

By controlling the rate of extrusion of the pressurized aerogel into the body of water in such a way that collective radial collapse of the aerogel occurs, driven by hydrostatic pressure, the interstitial ingress of water can be largely eliminated. Thus, concentrating the cavities in water is accomplished by waiting for natural processes to result. Optionally, a centrifuge (280) promotes further concentration of cavities.

A fourth step in the method of using the second embodiment of the device for making the quasi-liquid, is extracting the quasi-liquid as a product. Preferably, a flow of inert gas (212), such as nitrogen, is directed over the surface of the quasi-liquid to enable lifting of bubbles from the surface. The inert gas (212) mechanically pushes the cavities off the surface of the liquid, forming bubbles that are carried out the top extraction port. Nitrogen is a preferred inert gas for lifting the bubbles because it is inexpensive and readily available. Since the cavities shrink when a bubble is formed because they acquire a second skin or wall, the inert gas flow is a means to refine the quasi-liquid to quasi-liquid with a higher storage pressure.

In an alternative embodiment, the quasi-liquid at the top of the water column, is extracted with a scoop or by allowing the quasi-liquid to flow over the top of a weir at the top of the water column.

The description above and the examples noted are not intended to be the only embodiments of this invention and should not be construed as limiting the scope of the invention. These examples merely provide illustrations of some of the embodiments of this invention. Others will be obvious to those skilled in the art. Thus, the scope of the invention is determined by the appended claims and their legal equivalents rather than by the examples given.

INDUSTRIAL APPLICABILITY

Gas bubble storage is useful in industries requiring gas storage capability, such as the natural gas industry, chemical industries, the energy industry and the transportation industry.

The invention claimed is:

1. A quasi-liquid comprising a gas stored within bubbles of less than 5 nanometers in diameter and greater than about 0.8 nanometers in diameter, wherein the bubble comprises a spherical skin that is different matter than the gas.

2. A device for making the quasi-liquid of claim 1 comprising,
   a channel plate having an exit face below the surface of a liquid; and
   a gas mixture comprising the gas to be stored and a gaseous form of the liquid flowably connected to one end of the channel plate such that the gas can pass through the channel plate and out its exit face to form bubbles.

3. The device of claim 2 further comprising a laser to fracture the bubbles into smaller bubbles.

4. The device of claim 3 wherein the laser is an argon-ion laser.

5. The device of claim 2 further comprising a sonic device attached to the channel plate to deposit high frequency energy to dislodge bubbles emerging from the exit face of the channel plate.

6. A process for making bubbles using the device of claim 3 comprising the steps of,
   passing the gas through the channel plate to form bubbles;
   illuminating the bubbles exiting the channel plate with the laser to fracture the bubbles into smaller bubbles; and,
   collecting bubbles from the surface of the liquid.

7. The device of claim 2 wherein the gas to be stored is not dissolvable in the liquid or in a fluid that constitutes a wall of the bubble.

8. The device of claim 2 wherein the liquid is hydrophobic; and, the gas comprises,
   a gas to be stored that does not dissolve in water;
   steam; and,
   a vapor of the hydrophobic liquid.

9. The device of claim 8 wherein the hydrophobic liquid is denser than water.

10. The device of claim 8 wherein the hydrophobic liquid is 1,4 diiodobutane.

11. The device of claim 8 wherein the gas to be stored that does not dissolve in water is selected from a group consisting of hydrogen, propane and natural gas.

12. The device of claim 8 wherein the ratios of gas to be stored and steam in the vapor of the hydrophobic liquid are about 40 and 10 parts per million, respectively.

13. The device of claim 8 further comprising,
   a vessel to hold the hydrophobic liquid;
   a means for minimizing boiling of the hydrophobic liquid above the exit face of the channel plate;
   a means for collecting bubbles off the surface of the liquid;
   a means for cooling the hydrophobic liquid to maintain a temperature below the boiling points of the hydrophobic liquid and water; and,
   a means for maintaining hydrophobic liquid at a level above the channel plate.

14. The device of claim 13 wherein the means for cooling is a heat exchanger.

15. The device of claim 13 wherein the means for collecting bubbles is a gas flow acting on the bubbles and delivering them to a collection container.

16. The device of claim 13 wherein the means for collecting the bubbles is a mechanical paddle configured to sweep the bubbles off the surface into a collection container.

17. The device of claim 13 wherein the means for collecting the bubbles is a rotator of the liquid such that a centrifugal effect drives the bubbles outward from the center of rotation and towards the perimeter of the vessel.

18. The device of claim 13 wherein the means for maintaining the level is a weir formed by the top edge of the vessel configured to permit the excess hydrophobic liquid to overflow the top edge.

19. A process of using the device of claim 13 comprising the steps of,
   passing the gas through the channel plate to form bubbles; and,
   collecting the bubbles from the surface of the liquid.

20. The quasi-liquid of claim 1 wherein the bubbles are cavities.

21. A device for the production of the cavities of claim 20 comprising a vertical water column having a surface, a bottom insertion tube, a bottom exit port, a top extraction port above the surface of the water column, and a water inflow tube.

22. The device of claim 21 further comprising a centrifuge adjoining the top extraction port.

23. The device of claim 21 wherein the top extraction port is aligned along the axis of the water column.

24. A method of using the device of claim 21 comprising the steps of,
  diffusing a gas to be stored into pores of a low-density, solid-content material;
  removing the gas from the pores in an underwater environment such that cavities are formed;
  concentrating the cavities to form a quasi-liquid; and
  extracting quasi-liquid as a product.

25. The method of claim 24 further comprising the step of adding makeup water to the water column through the water inflow tube.

26. The method of claim 24 wherein the solid-content material is silica gel.

27. The method of claim 26 further comprising the step of removing disintegrated silica gel from the water column through the bottom exit port.

28. The method of claim 24 wherein removing the gas from the pores in an underwater environment is performed at a water depth of about 30 meters.

29. The method of claim 24 wherein removing the gas from the pores in an underwater environment is performed by extruding the low-density, solid-content material through the bottom insertion tube.

30. The method of claim 24 wherein removing the gas from the pores in an underwater environment is performed by forcing the gas through the pores of the low-density, solid-content material.

31. The method of claim 24 wherein the gas to be stored is hydrogen and water vapor.

32. The method of claim 24 wherein extracting quasi-liquid as a product is achieved by inert gas flow to mechanically push the cavities off the surface of the quasi-liquid and out the top extraction port.

33. A method of using the device of claim 21 comprising the steps of,
  diffusing a gas to be stored into pores of a low-density, solid-content material;
  removing the gas from the pores in an underwater environment such that cavities are formed;
  concentrating the cavities to form a quasi-liquid; and,
  extracting bubbles from the quasi-liquid by blowing an inert gas over the surface of the quasi-liquid.

* * * * *